US009734674B1

(12) United States Patent
Rabe et al.

(10) Patent No.: US 9,734,674 B1
(45) Date of Patent: Aug. 15, 2017

(54) SONIFICATION OF PERFORMANCE METRICS

(71) Applicant: EMC Corporation, Hopkinton, MA (US)

(72) Inventors: Bruce R. Rabe, Dedham, MA (US); Nagasimha G. Haravu, Apex, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 14/755,118

(22) Filed: Jun. 30, 2015

(51) Int. Cl.
*G08B 25/08* (2006.01)
*G08B 3/00* (2006.01)
*G06F 3/16* (2006.01)

(52) U.S. Cl.
CPC .......... *G08B 3/00* (2013.01); *G06F 3/16* (2013.01)

(58) Field of Classification Search
CPC ........ A61B 5/7405; A61B 5/7415; A61B 5/74
USPC .............................................. 340/692, 691.1
See application file for complete search history.

(56) References Cited

U.S. PATENT DOCUMENTS 5,730,140 A * 3/1998 Fitch .................... A61B 5/0205
600/514
5,749,372 A * 5/1998 Allen ..................... A61B 5/486
482/8

\* cited by examiner

*Primary Examiner* — Kevin Kim
(74) *Attorney, Agent, or Firm* — BainwoodHuang

(57) ABSTRACT

Examples are generally directed towards sonifying performance metrics. A computing device includes one or more data storage devices coupled to one or more processors. A performance dashboard controller maps a plurality of performance status updates corresponding to a plurality of points within a time range to a set of sound recordings to identify an audible performance indicator for the at least one object. A performance status update indicates a change in a performance status of the at least one object at a given point in time. The audible performance indicator sonifies the plurality of performance status updates at the plurality of points relative to the performance threshold. The audible performance indicator is output by an output device. The audible performance indicator identifies changes in performance status of the at least one object during the time range.

20 Claims, 11 Drawing Sheets

SONIFICATION OF PERFORMANCE METRICS

CROSS-REFERENCE TO RELATED APPLICATION

This application is related to non-provisional U.S. patent application no. 14/755,095 and titled "Animated Array Performance Dashboard" filed on Jun. 30, 2015.

BACKGROUND

Performance related information associated with a computing device may be gathered from a variety of physical and logical components of the computing device. For example, performance information may be gathered from processors, hard disks, flash drives, ports, logical drives, file systems, as well as other components. The performance information for a single component may be obtained in a visual chart with time on the x-axis for that single component.

If a user requires performance information for more than a single component in a system, the information typically is scattered over several different visual screens, charts, tables, and/or graphs representing the different components. In some situations, performance information for multiple components may be available in a static heat map. However, a heat map only provides performance information for a single point in time.

In order to view performance data for more than one component of a system related to performance of the components at multiple different points in time, the user is typically required to manually search multiple sources of performance information provided on multiple different screens. The user may then be required to manually attempt to consolidate the disparate performance information for analysis. This is a painstaking, tedious, laborious, and inefficient process for users which may result in unrecognized, undiagnosed, and/or unresolved performance issues within the system.

Moreover, these various sources of performance information are provided virtually exclusively in a visual format. If a user is blind or visually impaired, it may be difficult or impossible for the user to obtain desired performance information for one or more components of a computing system.

SUMMARY

Examples of the disclosure provide for sonifying performance metrics. In an example, a plurality of performance status updates for an object at a plurality of points within a time range is derived by a performance dashboard controller based on performance metric data collected at the plurality of points and a performance threshold. The performance metric data includes metric data quantifying performance of the object in accordance with at least one metric. The performance dashboard controller maps the plurality of performance status updates to a set of sound recordings to identify an audible performance indicator. The audible performance indicator sonifies the plurality of performance status updates at the plurality of points relative to the performance threshold. In other words, the performance status data is converted into an audio format that is audible by a human user.

An output device outputs the audible performance indicator. The audible performance indicator includes a first sound corresponding to a first performance status of the object at a first point within the time range and a second sound corresponding to a second performance status of the object at a second point within the time range to indicate changes in performance status of the object during the time range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
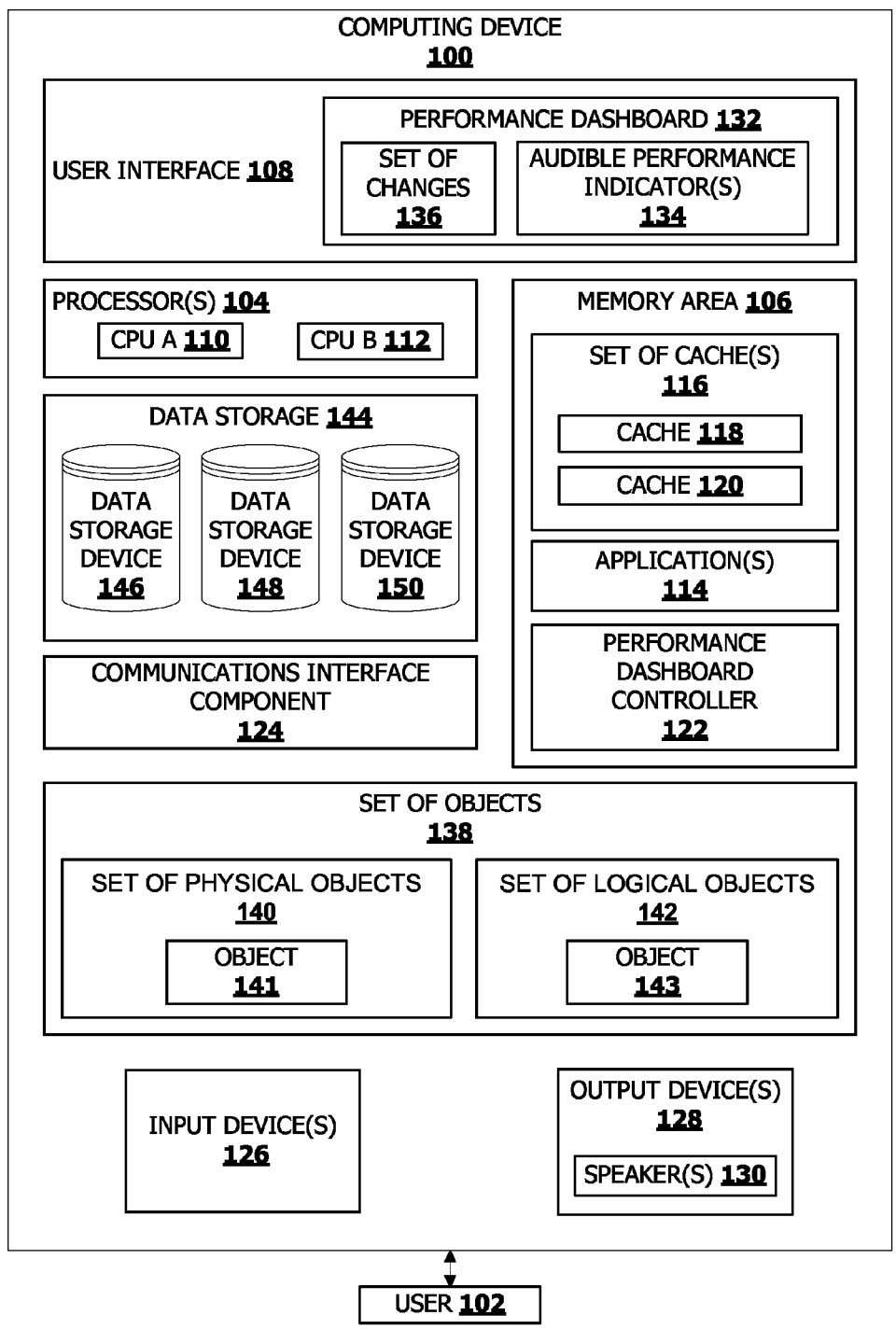
FIG. 1 is an exemplary block diagram illustrating a computing device for sonifying performance metric data.

Referring to the figures, examples of the disclosure provide animation of performance metric data associated with multiple components of a computing device. Aspects of the disclosure provide sonification of performance metric data. A performance dashboard controller generates an audible performance indicator which presents performance metric data for one or more objects of a computing device to the user in a single user interface. This sonification of metric data enables a blind or visually impaired user to obtain performance metric data and perform analysis of object performance based on audible information presented to the user in an efficient and user-friendly manner.

Aspects of the disclosure further enable a user to gain more efficient access to performance information by presenting the performance information in a single source and common format accessible to both visually impaired users as well as users having normal vision. Moreover, several metrics can be played at the same time using different timbres or brightness.

In some aspects, the audible performance indicator is presented in conjunction with graphic images within a user interface, such as a graphical user interface. This enables users to identify performance problems associated with one or more components of a computing device by reference to a single display screen while providing an option to sonify the performance metric data, improving user efficiency via user interface interaction and increasing user interaction performance.

Aspects of the disclosure further provide a performance dashboard which consolidates performance metric data from a plurality of different objects into a single display instead of requiring a user to view performance information for different objects in multiple different screens. The performance dashboard permits a user to listen to sonified metric data and/or performance status of an object relative to a threshold to discover trends in performance of various different objects occurring within a given range of time.

Sonification of metric data and performance status of an object enables greater user efficiency and accuracy by proving performance metric data and/or performance status indictors in an auditory only format, as well as a combination of auditory and visual formats.

Some aspects of the disclosure consolidate performance metric data within the performance dashboard and/or a single database to further increase the speed with which a user may obtain relevant and/or desired performance metric data. The utilization of a single performance dashboard to sonify performance metric data and/or performance indicators further conserves memory and reduces processor load by reducing the number of display screens a user must display and/or view to obtain the desired performance information for one or more objects of a system.

Further aspects of the disclosure stores performance status updates in a database for easy and efficient retrieval by the performance dashboard controller. This reduces network bandwidth usage and processor load by further reducing the number of queries and/or searches performed by the performance dashboard controller and/or user attempting to obtain the performance metric data for one or more different objects.

Aspects of the disclosure further provide audible performance indicators with changing sounds and/or changing distortion levels to indicate changes in performance of a given object over time relative to a selected metric and a selected threshold. This enables the user to quickly and efficiently identify trends in performance of a single object, as well as multiple different objects, over time. The audible performance indicators also permit users to identify a performance problem without viewing a single visual chart, graph, table, or screen.

Moreover, in many cases, human hearing may be more sensitive to auditory changes than to visual changes. Thus, the audible performance indicators further enable recognition of performance problems associated with one or more objects more quickly, accurately, and efficiently by sonifying data. In other words, human users may be able to more accurately and quickly identify a performance problem by recognizing a distortion in an audible performance indicator than by viewing a visual chart, table or graph because human hearing is able to distinguish subtle changes in sound and distortion levels more efficiently and effectively than by would be apparent when relying solely on a visual change in an image or graph. Thus, the audible performance indicators enable increased recognition of performance problems for improved overall computer system performance.

FIG. 1 is an exemplary block diagram illustrating a system for sonifying performance metric data. In the example of FIG. 1, a computing device 100 associated with a user 102 represents a system for sonifying performance metric data associated with one or more objects relative to a performance threshold.

The computing device 100 represents any device executing instructions (e.g., as application programs, operating system functionality, or both) to implement the operations and functionality associated with the computing device 100. In some examples, the computing device 100 is a storage system, such as, but without limitation, a data storage system or cloud storage system.

In other examples, the computing device 100 may include a mobile computing device or any other portable device. In some examples, the mobile computing device includes a mobile telephone, laptop, tablet, computing pad, netbook, gaming device, and/or portable media player.

The computing device 100 may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device 100 has at least one processor 104, a memory area 106, and at least one user interface 108. The one or more processor(s) includes any quantity of processing units. In some examples, the processor(s) 104 includes central processing unit (CPU) A 110 and/or central processing unit (CPU) B 112. In other examples, the processor(s) 104 may include only a single processing unit, as well as three or more processing units.

The one or more processor(s) 104 are programmed to execute computer-executable instructions for implementing aspects of the disclosure. The instructions may be performed by a single processor or by multiple processors within the computing device 100, or performed by a processor external to the computing device 100. In some examples, the processor(s) 104 are programmed to execute instructions such as those illustrated in the figures (e.g., FIG. 9, FIG. 10, FIG. 11, and FIG. 12).

In some examples, the processor(s) 104 represent an implementation of analog techniques to perform the operations described herein. For example, the operations may be performed by an analog computing device and/or a digital computing device.

The computing device 100 further has one or more computer readable media such as the memory area 106. The memory area 106 includes any quantity of media associated with or accessible by the computing device 100. The memory area 106 may be internal to the computing device (as shown in FIG. 1), external to the computing device (not shown), or both (not shown). In some examples, the memory area 106 includes read-only memory (ROM) and/or memory wired into an analog computing device.

The memory area 106 stores, among other data, one or more application(s) 114. The application(s) 114, when executed by the processor(s) 104, operate to perform functionality on the computing device 100. Exemplary application(s) 114 include mail application programs, web browsers, calendar application programs, address book application programs, messaging programs, media applications, location-based services, search programs, and the like. The application(s) 114 may communicate with counterpart applications or services such as web services accessible via a network (not shown). For example, the application(s) 114 may represent downloaded client-side applications that correspond to server-side services executing in a cloud.

The computing device 100 further has one or more computer readable media such as the memory area 106. The memory area 106 includes any quantity of media associated with or accessible by the computing device 100. The memory area 106 may be internal to the computing device 100 (as shown in FIG. 1), external to the computing device (not shown), or both (not shown). In some examples, the memory area 106 includes read-only memory (ROM) and/or memory wired into an analog computing device.

The memory area 106 stores, among other data, one or more application(s) 114. The application(s) 114, when executed by the processor(s) 104, operate to perform functionality on the computing device 100. Exemplary application(s) include mail application programs, web browsers, calendar application programs, address book application programs, messaging programs, media applications, location-based services, search programs, and the like. The application(s) may communicate with counterpart applications or services such as web services accessible via a network (not shown). For example, the application(s) 114 may represent downloaded client-side applications that correspond to server-side services executing in a cloud.

The memory area 106 further stores a set of cache(s) 116. The set of cache(s) may optionally include one or more caches, such as, but without limitation, cache 118 and cache 120. In other example, the cache(s) may include a single cache, as well as three or more caches. In some examples, the set of cache(s) 116 includes a read cache and/or a write cache.

The memory area further stores one or more computer-executable components. Exemplary components include a performance dashboard controller 122. The performance dashboard controller 122 component, when executed by the processor(s) 104 of the computing device 100, causes the processor(s) 104 to derive a plurality of performance status updates corresponding to a plurality of points within a time range based on performance metric data for at least one object and a threshold. The performance dashboard controller 122, when further executed by the processor(s) 104 to further map the plurality of performance status updates to a set of sound recordings to form an audible performance indicator. The audible performance indicator is a set of one or more sounds or sound recordings that, when played, identify changes in performance status of the at least one object during the time range relative to a selected metric and a performance threshold associated with the selected metric. Thus, the performance dashboard controller 122 uses non-speech audio to convey metric data to a user.

In some examples, a communications interface component 124 includes a network interface card and/or computer-executable instructions (e.g., a driver) for operating the network interface card. Communication between the computing device 100 and other devices may occur using any protocol or mechanism over any wired or wireless connection. In some examples, the communications interface component 124 is operable with short range communication technologies, such as by using near-field communication (NFC) tags.

In some examples, the user interface 108 includes a graphics card for displaying data to the user 102 and receiving data from the user 102. The user interface 108 component may also include computer-executable instructions (e.g., a driver) for operating the graphics card. Further, the user interface 108 may include a display (e.g., a touch screen display or natural user interface) and/or computer-executable instructions (e.g., a driver) for operating the display. In some examples, the user interface 108 is a graphical user interface (GUI). In other examples, the user interface 108 includes a browser.

The computing device 100 may also include one or more input device(s) 126 and one or more output device(s) 128 to provide data to the user 102 or receive data from the user 102. The input device(s) 126 and output device(s) 128 may include, without limitation, one or more speakers, a sound card, a camera, a microphone, a vibration motor, one or more accelerometers, a BLUETOOTH brand communication module, global positioning system (GPS) hardware, and a photoreceptive light sensor. For example, the user 102 may input commands or manipulate data by moving the computing device 100 in a particular way.

In some examples, the output device(s) 128 includes one or more speaker(s) for outputting audible performance indicators and/or other audio data. In these examples, a performance dashboard 132 plays one or more audible performance indicator(s) 134, including performance indicators having one or more levels of distortion representing a set of changes 136 in performance status of the one or more objects occurring during a selected time range in an audio output format, such as a series of sound recordings or clips played on one or more speaker(s) 130 of output device(s) 128.

The audible performance indicator(s) 134 generated by the performance dashboard controller 122 include performance status update information for a set of objects 138 at a plurality of points within a time range relative to a threshold. The set of objects 138 is a set of one or more objects associated with a computing device. The set of objects 138 may be objects associated with this computing device 100 or objects associated with a remote computing device.

In some examples, the set of objects 138 may include all the physical and logical objects associated with a computing device for which performance metric data is available. In other examples, the set of objects 138 includes only one or more objects selected by the user 102.

In still other examples, the set of objects 138 may include objects associated with grouping criteria. In other words, the user 102 may apply grouping criteria to select one or more objects associated with each other relative to some criteria. In one example, grouping criteria may include only objects associated with a particular storage processor or cache. In other examples, a grouping criteria may be used to identify all objects associated with a particular application. In this example, the processor, storage device, cache, and file systems utilized by the application would be included within the selected group of objects.

The set of objects 138 may include a set of physical objects 140. A set of physical objects 140 may include one or more processor(s), one or more disks, one or more flash drive(s), one or more port(s), or any other physical components having performance metric data associated with it.

For example, the set of physical objects may include data storage 144 including at least one data storage device, such as data storage devices 146, 148, and 150. In some examples, the data storage 144 may include a data storage array. The data storage 146 may also include one or more types of data storage devices, such as, for example, one or more hard disk drives (HDD) and/or one or more solid state drives (SSDs), such as a flash drive.

The set of objects 138 may include a set of logical objects 142. A set of logical objects 142 may include one or more logical units (LUNs), one or more file systems, or any other logical components associated with computing device 100 for which performance metric data is available.

The set of objects 138 may also include one or more pools. A pool may be associated with physical objects or logical objects.

Figure 2:
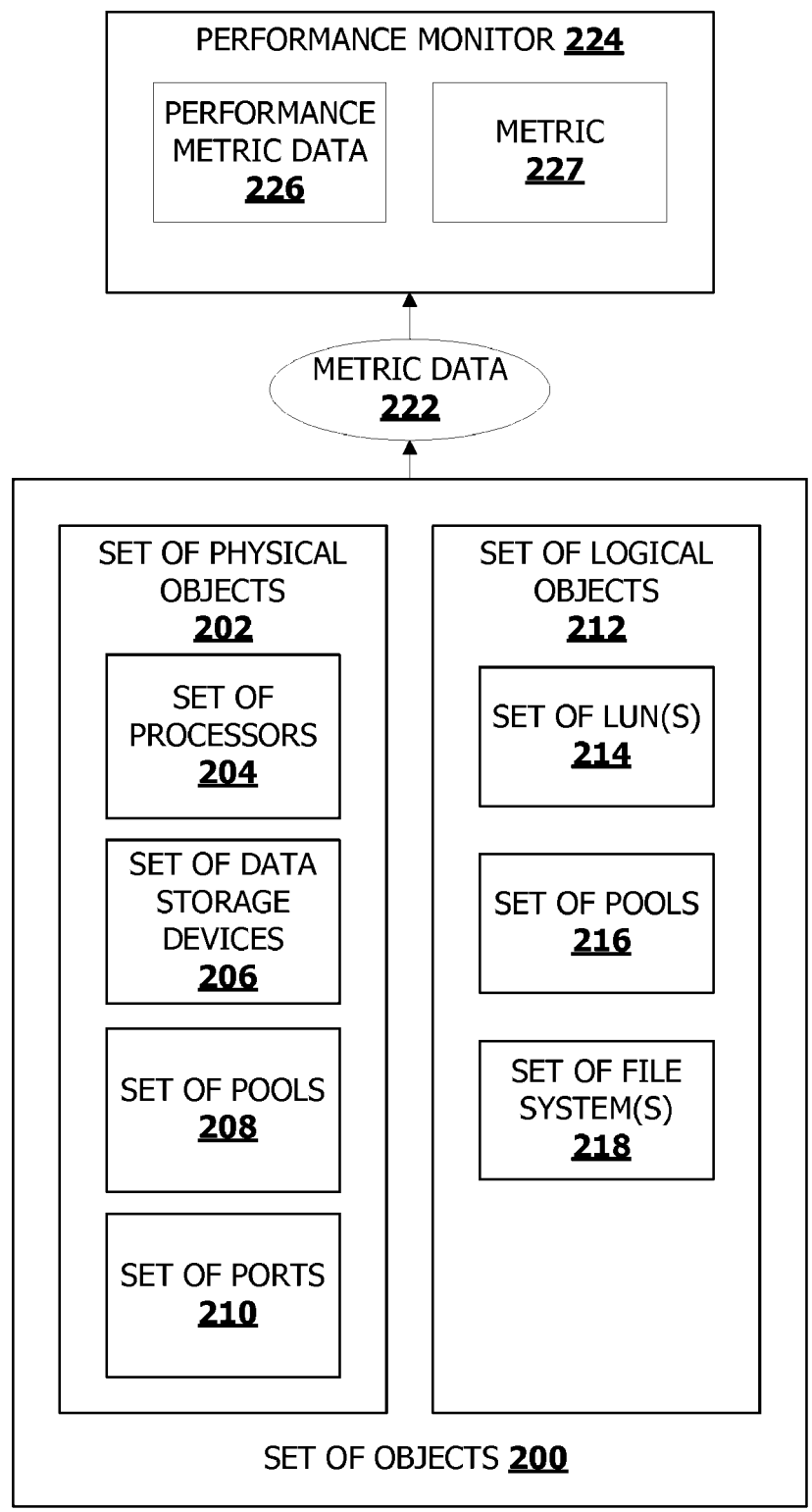
FIG. 2 is an exemplary block diagram illustrating a performance monitor for gathering performance metric data.

FIG. 2 is an exemplary block diagram illustrating a performance monitor for gathering performance metric data. Set of objects 200 is a set of one or more objects associated with a computing device. The computing device may be a data processing system, a storage system, cloud storage, a personal computer, a tablet computer, a smart phone, or any other type of computing device.

The set of objects 200 may optionally include a set of physical objects 202. The set of physical objects in this example is a set of one or more physical objects.

The set of physical objects 202 may optionally include a set of one or more processor(s) 204, a set of one or more data storage devices 206, a set of one or more pools 208, and/or a set of one or more ports 210. As used herein, the term set includes one or more. For example, the set of processor(s) 204 includes one or more processors.

The set of ports 210 is a set of one or more ports. A port is a network port, such as, but without limitation, an Ethernet Port or a Fibre Channel (FC) port. The set of data storage devices 206 may include hard disk drive (HDD) rotating disks, flash drives, optical disks, and redundant array of independent disks (RAID) array or any other type of physical data storage device.

In some examples, the set of physical objects 202 includes one or more physical objects not shown in FIG. 2. For example, the set of physical objects 202 may optionally include one or more fan(s) or any other physical object having metric data 222 associated therewith.

In other examples, the set of objects 200 includes a set of logical objects 212. The set of logical objects 212 optionally includes a set of LUN(s) 214, a set of pools 216, and/or a set of file system(s) 218. In other words, the set of logical objects 212 may include one or more LUN(s), file system(s) and pools. However, in other examples, the set of logical objects 218 may include the set of LUN(s) 214 and the set of pools (216). In still other examples, the set of logical objects 212 may include the set of pools 216 and the set of file system(s) 218.

The set of LUNs 214 in some examples includes one or more LUNs on a storage array. In other examples, set of pools 216 includes two or more storage pools having a different size or capacity. In still other examples, the set of logical objects 212 optionally includes other logical objects not shown in FIG. 2. For example, but without limitation, the set of logical objects 212 may include one or more logical volumes, logical disks, or any other type of logical objects associated with the computing device and having metric data 222 associated therewith.

The metric data 222 includes the data identifying performance of the object based on a selected metric and a time stamp indicating the point in time at which the metric data was collected. A metric is a unit of measure for determining performance of a computing device object at a given point in time. The metric may include any type of metric for measuring or quantifying performance of a physical or logical object. Non-limiting examples of performance metrics include latency, processor speed, processor utilization, temperature, bandwidth usage or traffic, capacity, queue length, cache hit ratio, cache dirty percentage, or any other metric.

A given point in time is a fixed or static time, such as three o'clock (3:00) or fifteen minutes after twelve in the afternoon (12:15 pm). The time stamp may indicate the point in time even more specifically. For example, the time stamp may include the time in hours, minutes, seconds, and milliseconds. For example, a given point in time may be fifteen minutes and three seconds after one o'clock in the afternoon (1:15:03 p.m.). Thus, if the selected object is a processor, the selected metric is percentage utilization, the performance status data may indicate that the utilization of the processor at forty-five minutes and 52 seconds after seven o'clock p.m. (7:45:52 p.m.) the percentage utilization was fifty-one percent (51%). Thus, metric data is data measuring a performance of one or more computing device objects at a given point in time.

A performance monitor 224 component collects metric data 222 from the set of objects 200. The performance monitor 224 may be implemented as a physical hardware monitor for collecting performance data associated with one or more objects, a software component comprising computer executable instructions executing on one or more processors, or a combination of hardware and software components for polling one or more objects for metric data and storing the performance metric data in a database.

The metric data 222 may be metric data associated with a single metric or metric data associated with two or more different metrics. The metric data 222 in some examples is metric data collected for a single object. In other examples, the metric data 222 is metric data collected from two or more objects in the set of objects. The performance monitor stores the collected metric data 222 as performance metric data 226 within a database until it is needed by the performance dashboard controller. In some examples, the database is a relational database.

The performance metric data 226 is data associated with a selected metric 227. In some examples, the performance metric data 226 is collected from a single object. In other examples, the performance metric data 226 includes metric data associated with two or more different objects. The performance metric data 226 may also include metric data collected from a related group of objects, such as a group of disks in a storage array.

The performance dashboard controller generates a plurality of performance status updates for an object based on the performance metric data 226, at least one performance threshold, and a user selected time interval and/or user selected time range. The pluralities of performance status updates are utilized to generate the audible performance indicators for one or more objects.

The performance dashboard controller may utilize the plurality of performance status updates to create an audible performance indicator. Alternatively, the performance dashboard controller may identify the audible performance indicator based on the plurality of performance status updates for a particular object. In other words, the performance dashboard controller in some examples generates the audible performance indicator dynamically in real-time. In other examples, the performance dashboard controller identifies a pre-generated audible performance indicator and retrieves that pre-generated audible performance indicator from a database.

Figure 3:
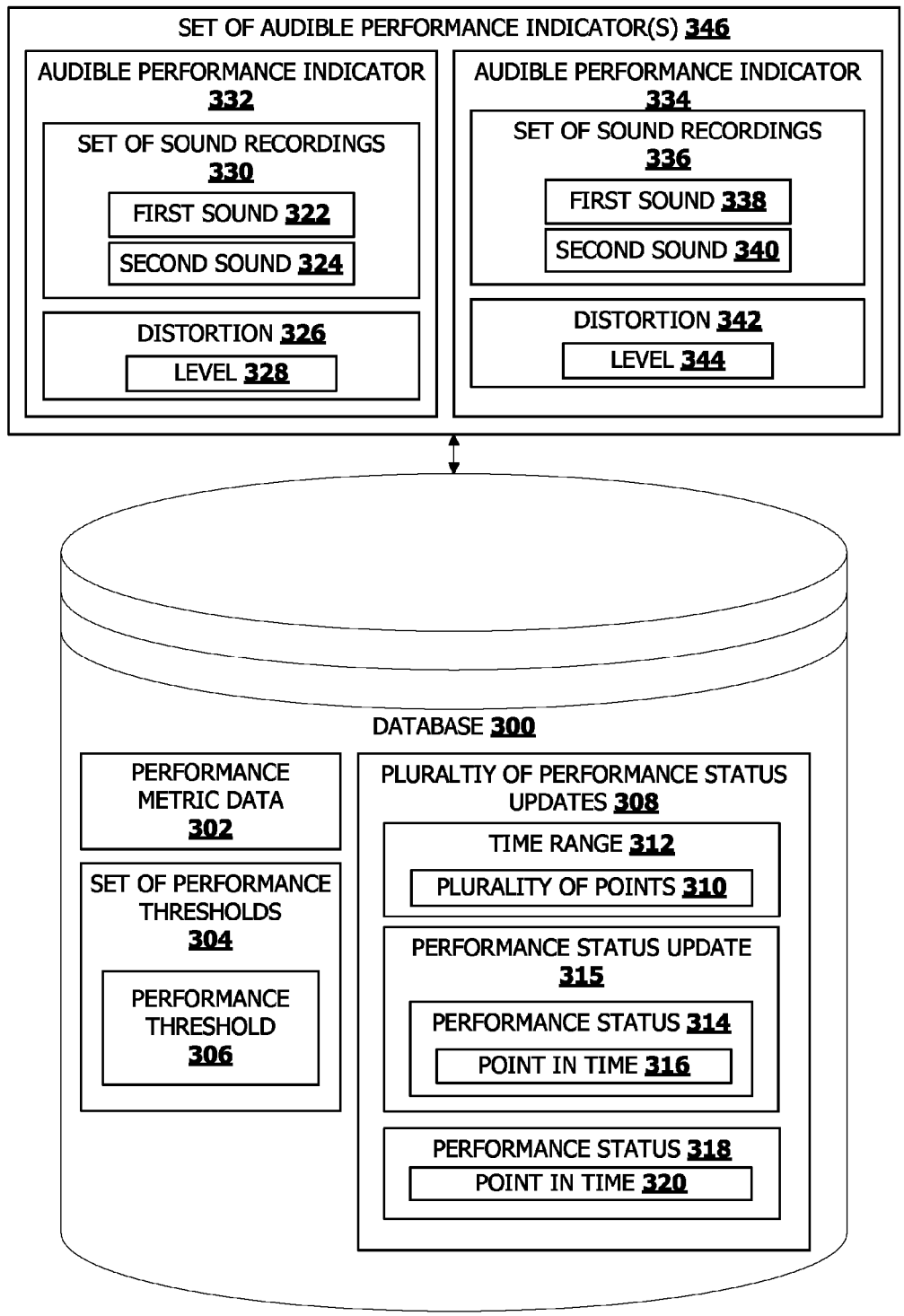
FIG. 3 is an exemplary block diagram illustrating generation of a set of audible performance indicators.

FIG. 3 is an exemplary block diagram illustrating generation of a set of audible performance indicators. In some examples, database 300 stores performance metric data 302 for at least one object. The database 300 in some examples is a relational database. The database 300 stores the performance metric data 302 gathered by the performance monitor.

The performance metric data 302 includes data measuring, quantifying, or describing the performance of an object at a given point in time for at least one selected metric. The metric may be a user selected metric or a default metric. The performance metric data 302 also includes time stamps identifying various points in time at which metric data for a given object was measured to identify a performance of the object in terms of the selected metric.

The performance dashboard controller may filter the performance metric data 302 based on read operations, write operations, operations associated with one or more applications, or any other type of operations. The performance metric data 302 may be filtered based on one or more selected types of operations and/or applications to generate audible performance indicator that are more relevant or of greater interest to the user.

For example, a user may wish to determine whether a particular application or types of operations are influencing the performance of the cache or processor performance. Thus, filtering the performance metric data 302 permits the user to identify objects and object performance that is being influenced or affected by particular applications or other operations.

In other examples, performance metric data 302 is filtered in accordance with one or more read operations. In these examples, the performance metric data 302 if filtered for metric data associated with performance of objects associated with one or more read operations. The filtered performance metric data 302 includes metric data for objects that are active during the one or more read operations and/or objects whose performance is influenced by the one or more read operations. In some examples, the set of audible performance indicator(s) 346 only sonifies changes in performance status of objects that are active during the one or more read operations.

In still other examples, performance metric data 302 is filtered in accordance with one or more write operations. In these examples, the performance metric data 302 if filtered for metric data associated with performance of objects associated with one or more read operations. The filtered performance metric data 302 includes metric data for objects that are active during the one or more write operations and/or objects whose performance is influenced by the one or more write operations. In some examples, the set of audible performance indicator(s) 346 sonifies only those changes in performance status of objects that are active during the one or more write operations. Filtering the performance metric data 302 permits the user to identify objects and object performance that is being influenced or affected by particular read operations or write operations.

A user may also choose to filter the performance metric data 302 in accordance with one or more grouping criteria to form a correlated set of objects. The set of audible performance indicator(s) 346 in these examples includes audible performance indicators for the one or more objects within the correlated set of object. In other words, the set of audible performance indicator(s) 346 in these examples includes only audible performance indicators representing the correlated set of objects. Objects that are not included within the correlated set of objects are not represented by audible performance indicators.

Database 300 optionally includes a set of performance thresholds 304. The set of performance thresholds 304 includes one or more performance thresholds, such as performance threshold 306. The performance threshold 306 defines an acceptable range of performance for a particular object relative to a given performance metric. The performance status of an object is determined relative to the performance threshold 306.

Determining a performance status relative to the performance threshold 306 refers to comparing a given performance status of an object to the threshold. The performance status may be within the acceptable threshold if the performance of the object is above a threshold, below a threshold, more than the threshold, less than the threshold, or within a threshold range.

A performance threshold 306 in the set of performance thresholds 304 may be a user selected threshold or a default threshold for a particular type of object and metric. In some examples, the performance threshold 306 is a discreet threshold. For example, the performance threshold 306 may be a queue length of two. A performance status of a given disk object may be determined to be within the performance threshold if the queue length for the disk at a particular moment or point in time is equal to or less than the threshold queue length of two.

In other examples, a performance state of an object may be within a threshold if the performance state is equal to or exceeds a given threshold. For example, a threshold for a cache object may be a cache hit of five percent (5%). If the performance state of the object indicates the cache hit is equal to or greater than five percent, the performance state of the object is within the threshold. If the cache hit ratio falls below the five percent cache hit threshold, the performance state is considered outside the threshold indicating a performance problem with the cache object.

In still other examples, the performance threshold 306 is a threshold range. A threshold range is a range of acceptable performance values having both an acceptable high threshold value and an acceptable low threshold value. Any value falling between the high and low threshold values within the range are also acceptable values within the threshold range.

In some non-limiting examples, a metric for a disk may be queue length. The threshold for the disk may be a queue length below equal to or less than two (2) for an acceptable range, a queue length between two and six (6) for a warning zone, and a queue length of six or greater for a critical zone.

In other examples, a metric for measuring performance of a LUN, a file system, or a port includes latency. In some examples, a latency of less than ten (10) milliseconds is within a normal or acceptable threshold range. A latency greater than or equal to ten (10) milliseconds in this example would fall outside the acceptable threshold range. For example, latency between ten (10) milliseconds and twenty-five (25) milliseconds is outside the acceptable threshold and within a warning zone.

If the latency for the object exceeds twenty-five milliseconds (25 ms) then the object performance status is within a critical zone outside the acceptable performance threshold. If a performance status update indicates a performance status of a LUN, port, or file system object within this critical zone range at a given point in time, the audible performance indicator is altered or changed during playback to change one or more sounds associated with the audible performance indicator for the object to indicate the performance status of the object is within the critical zone.

In other examples, a metric for quantifying performance of a read cache includes a cache hit ratio percentage. In such examples, a cache hit ratio greater than five percent (5%) is within an acceptable range. If the cache hit ratio percentage falls to five percent (5%) or less the performance status of the cache is outside the acceptable threshold. In other words, a cache hit ratio that is less than the five percent threshold indicates the performance status is within a warning zone.

In some non-limiting examples, a metric for a write cache is cache dirty percentage. In such cases, the threshold may be an eighty percent (80%) threshold. A performance status indicating a cache dirty percentage less than eighty percent would be within an acceptable threshold range. If the cache dirty percentage is equal to or greater than the eighty percent threshold, the performance status of the object is outside the acceptable threshold range or within a warning zone. If the cache dirty percentage exceeds ninety percent (90%) the performance status of the object is within a critical zone.

For example, a threshold range for latency of a port may include a performance threshold of zero (0) to nine (9) milliseconds. Any latency performance status for the port which is zero, nine, or any value falling between zero and nine is within the threshold range and considered to be an acceptable performance status within the threshold.

The performance dashboard controller generates a plurality of performance status updates 308 corresponding to a plurality of points 310 within a selected time range 312 for one or more objects. The time range 312 is a range of time having an upper bound and a lower bound encompassing the plurality of points 310. Each point in time within the plurality of points occurs at one or more intervals of time.

A performance status update 315 indicates a performance status of one or more objects at one or more points in time based on the performance metric data 302, one or more thresholds, such as performance threshold 306 for a selected metric. In this non-limiting example, the plurality of performance status updates 308 includes a first performance status 314 indicating a performance status of at least one object at a first point in time 316 and a second performance status of the at least one object at a second point in time 320.

For example, the first performance status 314 may indicate that a disk object queue length of one at seven forty-two (7:42 p.m.) is within a performance threshold where the performance threshold is a queue length of two. However, the second performance status 318 at the different point in time 320 may indicate that at seven fifty-two (7:52 p.m.), ten minutes after the first performance status 314, the queue length of the disk object increased to a queue length of three (3), placing the performance status 318 of the disk object at the second point in time 320 outside the acceptable performance threshold. In this example, the set of performance thresholds 304 indicates a potential performance problem associated with the disk queue length developing between 7:42 p.m. and 7:52 p.m. in the evening.

The set of audible performance indicator(s) 346 includes one or more audible performance indicators representing one or more objects. Each object is represented by a different audible performance indicator, such as audible performance indicator 332. Each audible performance indicator provides a dynamic, audible indicator for conveying changing performance information for a given object.

The performance dashboard controller maps each performance status within the plurality of performance status updates 308 for a given object to a sound recording identifying the performance status of the object relative to a threshold. The sound recording mapped to each performance status indicates the performance status.

For example, a file system object may have a performance threshold latency of ten milliseconds for a first level of performance problems and a threshold latency of twenty-five milliseconds (25 ms) for a second level of performance problem. The first level of performance problems may be referred to as a warning level. A performance status of an object that falls outside a performance threshold range by a second level, in some examples, indicates serious or critical performance problems. The second level of performance problems may be referred to as a critical level.

At a first point in time, the performance status 314 may indicate the performance is within an acceptable range for the file system. This performance status 314 may be mapped to a first sound 322. The first sound 322 may be a sound clip, a sound recording, or sound data. The sound clip may be any type of sound. The sound may be a musical instrument playing, a sound of weather, a nature sound, animal a whistle, a beep, a humming sound, an engine sound, a mechanical sound, acoustic music, orchestral music, or any other type of sound. For example, the first sound may be a recording of bird song, ocean sounds, rain, whale song, a tapping sound, drum beat, piano music, crickets chirping, a guitar solo, or any other type of sound.

In this non-limiting example, the first sound 322 may be a sound of violin music playing to indicate the performance of the file system is within an acceptable threshold range. At the second point in time 320 thirty minutes later, the second performance status 318 may indicate the performance is now above the first warning level but below the second critical level. The performance dashboard controller maps this second performance status 318 update to a second sound 324 of violin music with a first level 328 of distortion 326.

An amount of distortion added to an assigned sound indicates a severity of a performance problem. In other words, the greater the distortion blended with the assigned sound, the greater the severity of the performance problem. An absence of distortion indicates that the selected object is performing within an acceptable range without any apparent performance problems. As the level of performance problems associated with a selected object during a given time range increases, the level of distortion added to the audible performance indicator representing performance of the selected object during the time range also increase in proportion to the increasing performance problem. Thus, the level of distortion at a given point within playback of an audible performance indicator is proportional to the level of performance problems associated with the selected at the point in time corresponding to the given point within the playback.

A distortion 326 may be any change in a sound that indicates a change in performance of an object relative to the performance threshold 306. The first level of distortion may include changing a property of the violin sound. For example, changing a property of the sound may include increasing tempo, decreasing tempo, increasing amplitude, decreasing amplitude, increasing pitch, decreasing pitch, increasing a level of noise, such as static, or other sound distortions.

In other examples, the performance dashboard controller may map the second performance status 318 to a completely different second sound to indicate the change in performance status outside the threshold. This new second sound 324 may replace the first sound 322. For example, the sound of drums may replace the sound of the violin.

In other examples, the distortion 326 may be a completely different sound added to the first sound 322. The distortion 326 may be a sound of flutes, drums, a clicking sound, a whistling sound, or any other sound added to the violin sound to create a combination of sounds blending together to indicate the change in performance status.

In this non-limiting example, the second performance status 318 is mapped to a violin sound having a faster tempo. A third performance status for a third time period thirty minutes later indicate the performance of the file system may be above the second critical level. The performance dashboard controller maps this third performance status to a violin sound including a second level of distortion. The second level of distortion may include a faster tempo, a slower tempo, increased amplitude, decreased amplitude, a higher pitch, a lower pitch, an increased level of noise, static, or other distortion. The distortion may also include a completely different sound added to the violin sound. In this example, the distortion is a continued gradual increase in tempo.

The performance dashboard controller maps each performance status in the plurality of performance status updates 308 for a given object to create a set of sound recordings 330. The set of sound recording 330 includes one or more sound recordings indicating performance status at a given point in time. Each sound recording in the set of sound recordings corresponds to a different point in time within a time range. For example, the first sound 322 corresponds to a first point in time, such as five o'clock (5:00 p.m.). The second sound 324 correspond to the performance of the object at a second and different point in time within the time range, such as five minutes after five o'clock (5:05 p.m.). The sounds are played sequentially to form an audible performance indicator 332.

In other words, the audible performance indicator 332 includes a series of sounds, such as first sound 322 and second sound 324. The individual sounds 322 and 324 correspond to object performance at different points in time. The individual sounds are played in sequence as a continuous sound recording according to the time stamp or point in time associated with each sound. Thus, when audible performance indicator 322 is played, the first sound corresponding to a first point in time at 5:00 p.m. is played prior to the second sound corresponding to a second point in time at 5:05 p.m. In this manner, the individual sounds are played in order temporally in accordance with the time stamp indicating a time when the performance data was collected.

In some examples, a user may choose to play the audible performance indicator 322 in reverse, increase playback speed, pause audio playback, skip ahead within the playback by a given amount, or skip backwards within the playback by a given amount.

The performance dashboard controller maps the plurality of performance status updates for each selected object to a set of sound recordings to identify an audible performance indicator for each selected object. For example, a second audible performance indicator 334 representing a second object may include a set of sound recordings 336. The set of sound recordings 336 includes a first sound 338 and a second sound 340. A level 344 of distortion 342 indicates whether a performance status of an object is within an acceptable performance threshold or outside an acceptable performance threshold. The second audible performance indicator 334 for the second object includes a different assigned sound that is distinguishable from the sound associated with the first audible performance indicator 332 for the first object.

In some examples, the first audible performance indicator 332 and the second audible performance indicator 334 may be played simultaneously. For example, the first audible performance indictor 332 may include a sound of violins. The second audible performance indicator 334 may include a sound of piano playing. The audible performance indicators may be played together, simultaneously while enabling each audible performance indicator to be distinguishable over the other audible performance indicator. In other words, different audible performance indicators may be complementary such that multiple audible performance indicators may be played simultaneously without obscuring or masking the audible data.

In other words, several metrics can be played at the same time using different timbres or brightness. A control feature may be used to easily mute all except one of the metrics to focus attention on just one series of data. Playing metric values as audio allows for quick analysis of multiple metrics. This technique is accessible to visually challenged and impaired people.

Figure 4:
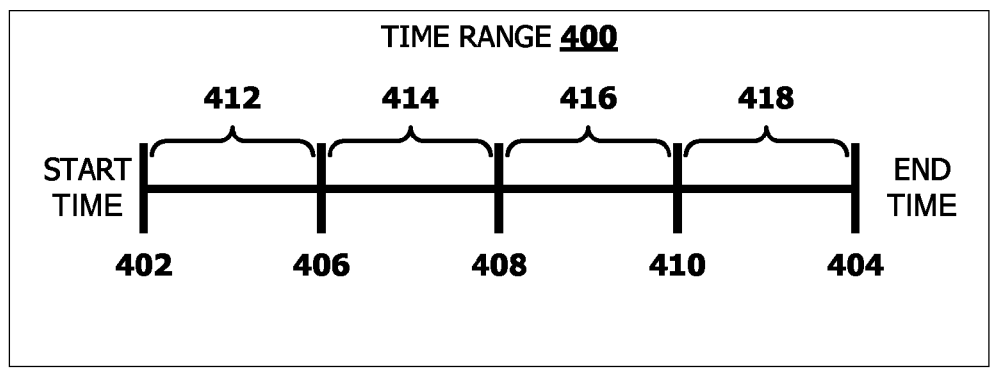
FIG. 4 is a block diagram of a time range.

FIG. 4 is a block diagram of a time range. A time range 400 is a range of time having a start time 402 and an end time 404. The start time 402 may be referred to as a starting point in time, an upper time bound, or a beginning time. The end time 404 may be referred to as a lower time bound, a stopping point, or an ending point in time. The time range 400 includes a plurality of points 402, 404, 406, 408, and 410 occurring at intervals 412, 414, 416, and 418.

A point in time is a static time, such as two o'clock (2:00 a.m.), three forty-five (3:45 p.m.) or five minutes and twenty-two seconds after one o'clock (1:05:22 p.m.). An interval is a gap or amount of time between individual points in time. An interval is a segment of time within the time range 400 bounded by a first point and a second point. For example, interval 412 is bounded by points 402 and 406. An interval may last any amount of time. An interval may be ten (10) milliseconds, one second, five (5) seconds, ten (10) minutes, thirty minutes, an hour, twenty-four (24) hours, a week, a month, a year, or any other time interval.

Each point within the plurality of points is determined based on a start time for the time range, an end time for the time range, and a time interval. The start time and end time are points within the time range. Other points within the time range are intervals of time within the time range. For example, if a time interval is five minutes, then a point within the plurality of points occurs every five minutes. If the start time is ten thirty, then the first point in time is ten thirty, a second point in time is ten thirty-five, a third point in time is ten forty, and so forth until the end time is reached.

For example, a time range 400 may be a time range having a start time 402 of two o'clock (2:00 a.m.) and an end time 404 of four minutes after two o'clock (2:04 a.m.) and having an interval of one minute. In this example, the plurality of points 402, 404, 406, 408, and 410 correspond to data gathered at one minute intervals. In other words, each point in the plurality of points may occur every one minute. So point in time 406 occurs at one minute after two o'clock (2:01 a.m.), point in time 408 occurs at two minutes after two o'clock (2:02 a.m.), point in time 410 occurs at three minutes after two o'clock (2:03 a.m.), and the end time 404 occurs at four minutes after two o'clock (2:04 a.m.).

Figure 5:
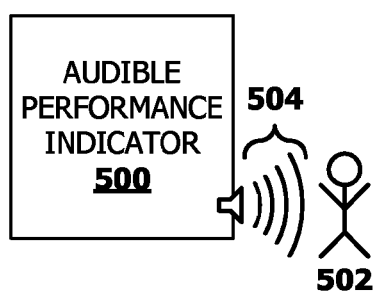
FIG. 5 is a block diagram of an audible performance indicator.

FIG. 5 is a block diagram of an audible performance indicator. An audible performance indicator 500 is played to generate sounds 504 audible to a user 502. The user 502 listens to the audible performance indictor 500 to distinguish changes in performance status of an object occurring at two or more different points in time. In other examples, the audible performance indicator 500 sonifies changes in performance status of an object occurring during one or more time intervals and/or within a time range.

The audible performance indicator enables users to play back performance data and listen for patterns that are not normal. The human ear is very good at identifying unusual patterns in the corresponding pitch, amplitude, or tempo.

Figure 6:
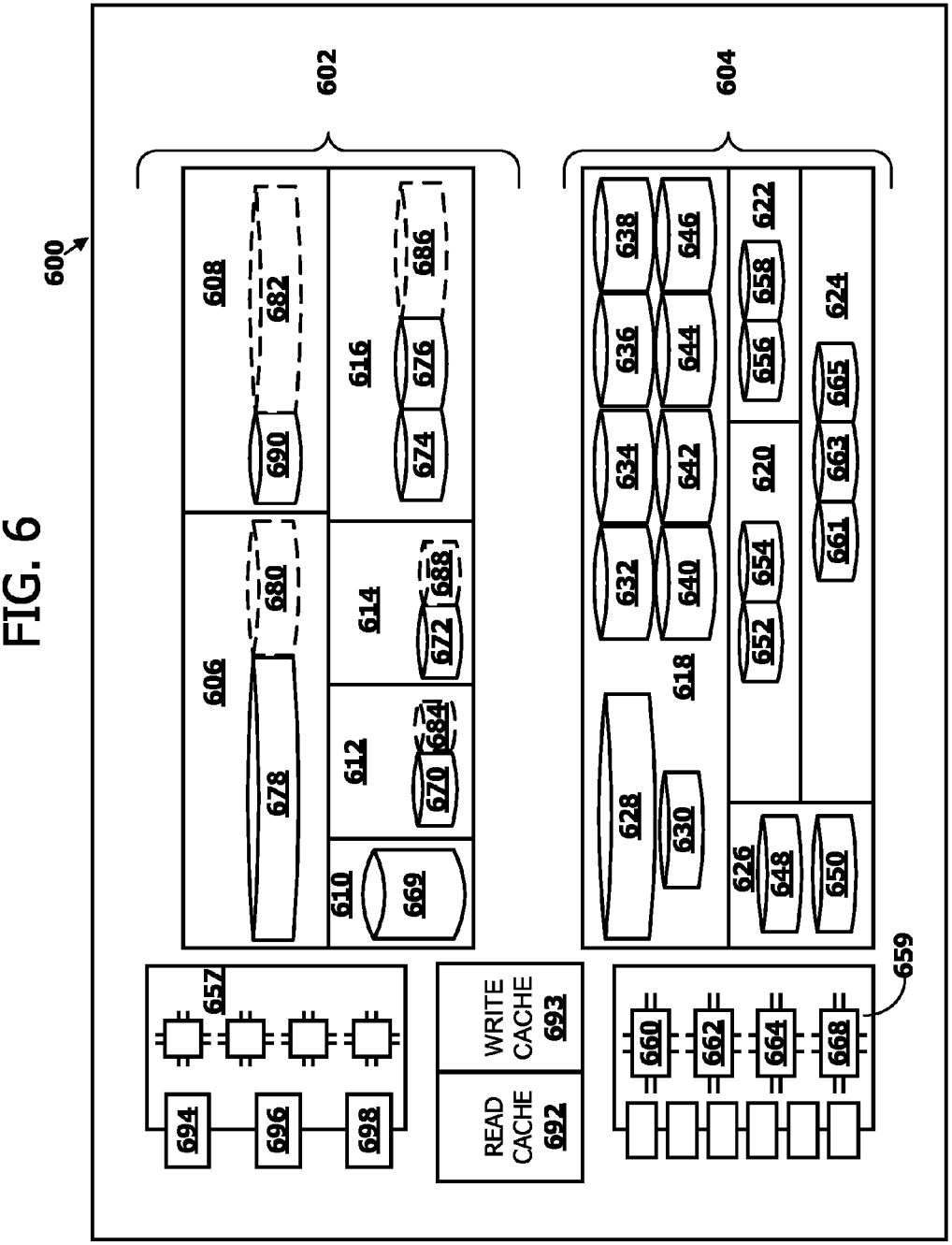
FIG. 6 is a block diagram illustrating a plurality of objects associated with a performance dashboard display.

FIG. 6 is a block diagram illustrating a plurality of performance indicators representing a plurality of objects within a performance dashboard display 600. The performance dashboard may optionally include a visual performance dashboard display providing a graphical representation of each object in the set of selected objects. A user may click or select a graphic representation of an object to start playback of an audible performance metric for that object.

In other examples, a user may start playback of an audible performance metric by speaking a verbal command, typing a command, touching a touch screen, or any other means for triggering playback of the audible performance indicator.

In this example, the performance dashboard display 600 including the representations of the selected objects is divided into a set of logical objects 602 and a set of physical objects 604.

The set of logical objects 602 may includes graphical performance indicators representing one or more pools, such as pool objects 606, 608, 610, 612, 614, and 616. The set of physical objects 604 may also include graphical performance indicators representing one or more pools, such as pool objects 618, 620, 622, 624, and 626.

In some examples, the size of the box representing the pool object is proportional to the pool capacity. Thus, pool object 606 represented by a larger box than pool object 614 has greater pool capacity than pool object 614. For example, if pool 606 has ten terabytes of capacity and pool 614 has three terabytes of pool capacity, pool 606 is represented by a larger rectangle shaped box than pool object 614.

Data storage devices are represented by graphical performance indictors within the performance dashboard display. In this example, the size of the graphical representation of a data storage device is not proportional to the data storage device capacity. However, in other examples, the size of the graphical representation may be proportional to the capacity of the storage device.

Graphical performance indicators represent physical data storage devices, such as hard disks and flash drives. In this non-limiting example, graphical performance indicators 628, 630, 632, 634, 636, 638, 640, 642, 644, and 646 represent data storage devices associated with pool 618. Tiers may be distinguishable, as shown by data storage objects 628 and 630. Arrays may be distinguishable, such as array of storage devices 632, 634, 636, 638, 640, 642, 644, and 646.

Graphical performance indicators 648 and 650 correspond to physical data storage associated with pool 626. Pool 620 includes data storage objects 652 and 654. Pool 622 is associated with data storage objects 656 and 658. Finally, pool 626 is associated with physical data storage objects 661, 663, and 665. The set of physical data storage objects is not limited to the number of physical objects shown in FIG. 6. The set of physical objects may include more physical data storage objects or fewer physical storage devices than those shown in FIG. 6.

The set of logical objects 602 includes a plurality of graphical performance indicator icons representing one or more logical objects. The logical objects may include file system objects and logical units (LUNSs). The sizes of the LUN and file system objects in this example are proportional to their capacity. However, in other examples, the sizes of the performance indicators representing a LUN or file system may not be proportional to capacity of the file system or LUN.

The LUN objects may include thickly provisioned LUNs and thinly provisioned LUNs. The thick LUN objects may be visually distinguishable from the thin LUN objects. For example, thick LUNs may be represented by performance indicators that include shading, an icon identifying the thick LUN, a unique shape that is distinguishable from the shape of the performance indicator for a thin LUN, etc. In this example, graphical performance indicators 669, 674, 676, and 678 represent thickly provisioned LUNs.

The size of a thin LUN performance indicator may represent allocated capacity. In this non-limiting example, thin LUN objects are represented by graphical performance indicators 670 and 672. Unallocated space is identified by a dotted line, as shown by performance indicators 680, 682, 684, 686, and 688. The physical storage objects may also include file systems. In this example, performance indicator 690 represents a file system object.

The set of physical objects 604 may also include one or more storage processors 657 and 659. A storage processor may include one or more processor cores, such as CPU 660, 662, 664, and 668. Each core is identified separately in this example.

The performance dashboard display may optionally include a graphical performance indicator for each physical port, such as ports 694, 696, and 698. The ports may include Ethernet ports, Fibre Channel ports, as well as any other type of port.

The performance dashboard display may optionally include a graphical performance indicator for each cache, such as read cache 692 and write cache 693. In this example, the dynamic random access memory (DRAM) cache and flash cache are grouped separately under read cache 692 and write cache 693.

The objects represented in the performance dashboard display 600 are a non-limiting example of objects that may be included within the performance dashboard display 600. The examples are not limited to the number of objects or types of objects shown in FIG. 6. The performance dashboard display may include fewer objects than those shown or a greater number of objects than those shown in FIG. 6.

Figure 7:
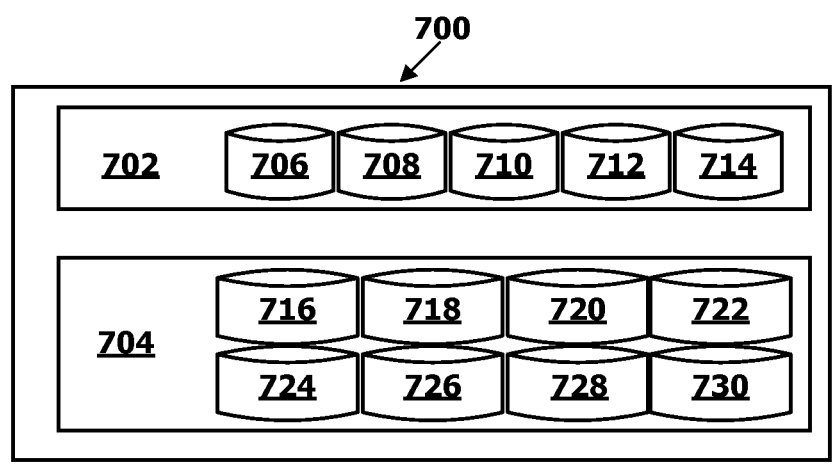
FIG. 7 is a block diagram illustrating a plurality of storage system objects.

FIG. 7 is a block diagram illustrating a plurality of performance indicators representing a plurality of storage system objects. In this example, a graphical representation of a pool 700 associated with a performance dashboard display represents a RAID array 702 and RAID array 704. The RAID array group boundaries are denoted by boundary lines enclosing the physical data storage devices included within each RAID array. In this example, physical data storage devices within RAID array 702 are represented by graphical icons 706, 708, 710, 712, and 714. The physical data storage devices within RAID array 704 are represented by graphical icons 716, 718, 720, 722, 722, 724, 726, 728, and 730.

The example shown in FIG. 7 is a non-limiting example. The examples may be implemented with RAID arrays including more physical data storage devices than those shown in FIG. 7, as well as RAID arrays including fewer physical data storage devices than those shown in FIG. 7.

Figure 8:
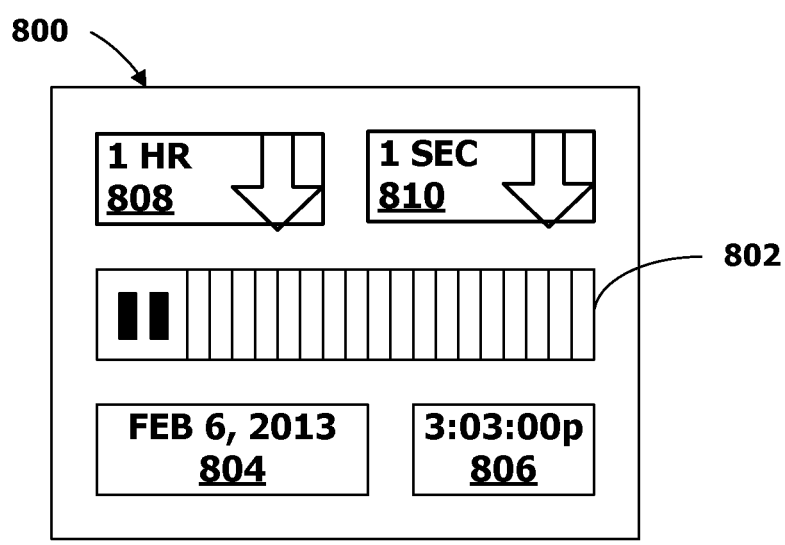
FIG. 8 is a block diagram illustrating a user control associated with a performance dashboard.

FIG. 8 is a block diagram illustrating a user control associated with a performance dashboard. The controller may be a control presented within a user interface. The user may select an interval of time using the controller 800. The user may select to play, pause, rewind, skip forward, or stop play of the audible performance indicator.

In some examples, the control 800 enables the user to select a time range 802 by entering a desired date 804 and time 806 to begin playing the audible performance indicator for the one or more objects.

The user may select an interval. The user may select to play, pause, rewind, skip forward, play at a faster speed, play at a slower speed, or stop play of one or more audible performance indicators. The user may select any time within the time range by clicking the play bar at the desired time. For example, the user may skip forward one hour 808 or one second 810 by selecting the appropriate point in time or time interval during the playback.

The control 800 in other examples displays a line chart showing all the metric values as well as tracking the playback time.

Figure 9:
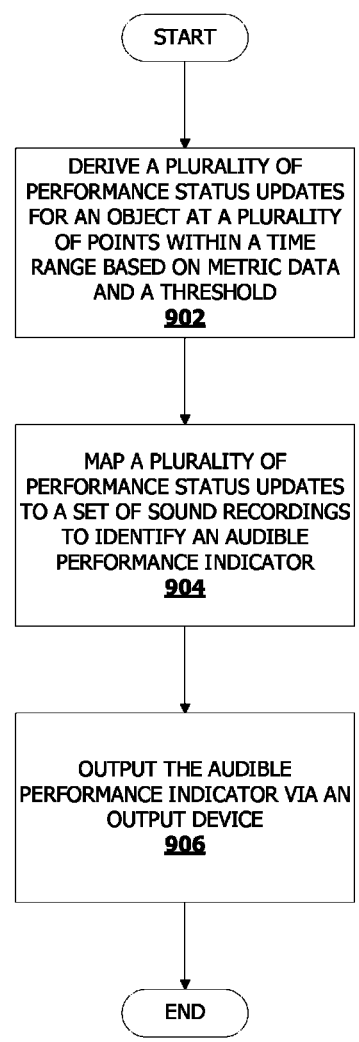
FIG. 9 is an exemplary flowchart illustrating sonification of performance metric data.

FIG. 9 is an exemplary flowchart illustrating sonification of performance metric data. The process shown in FIG. 9 may be implemented by a computing device, such as, but without limitation, computing device 100 in FIG. 1.

The process begin by deriving a plurality of performance status updates for an object at a plurality of points within a time range based on performance metric data and a threshold at operation 902. The process maps the plurality of performance status updates to a set of sound recordings to identify an audible performance indicator at operation 904. The process outputs the audible performance indicator via an output device at operation 906. The process terminates thereafter.

While the operations illustrated in FIG. 9 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 10:
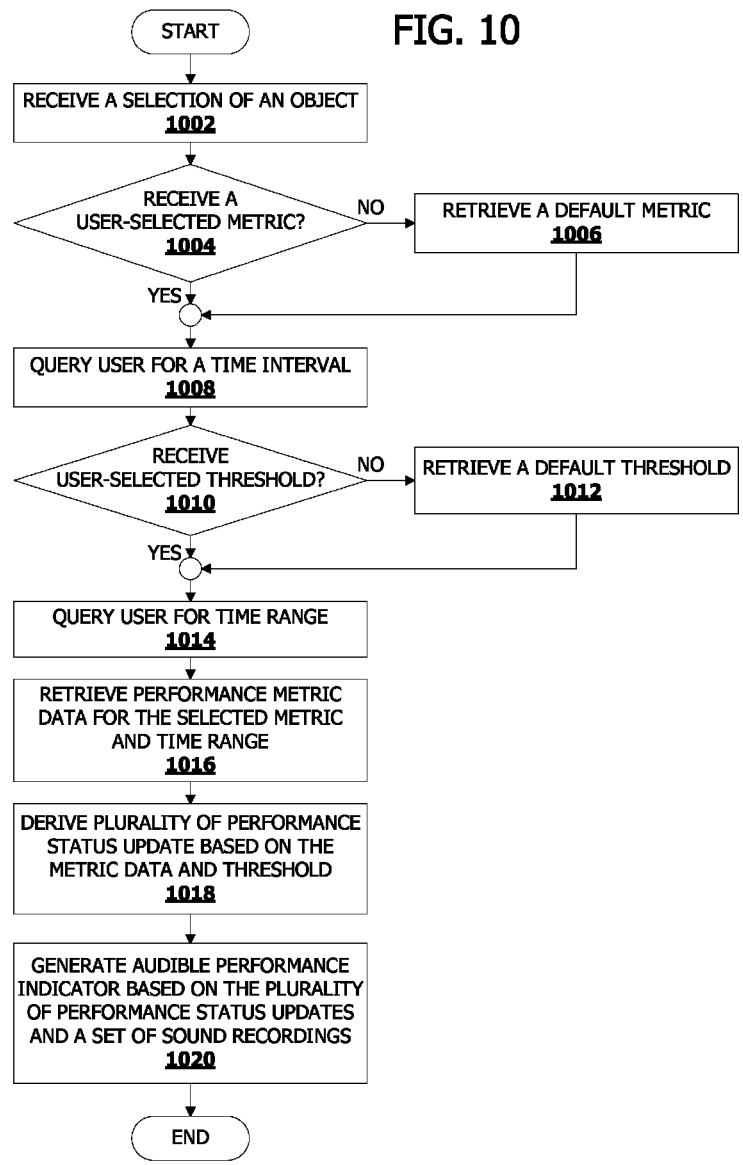
FIG. 10 is an exemplary flowchart illustrating generation of an audible performance indicator.

FIG. 10 is an exemplary flowchart illustrating generation of an audible performance indicator. The process shown in FIG. 10 may be implemented by a computing device, such as, but without limitation, computing device 100 in FIG. 1.

The process begins by receiving a selection of an object at operation 1002. The process determines whether a user-selected metric is received at operation 1004. If no, a default metric is retrieved at operation 1006. The process queries user for a time interval at operation 1008. The process determines whether a user selected threshold is received at operation 1010. If no, a default threshold is retrieved at operation 1012.

The process queries a user for a time range at operation 1014. The process retrieves performance metric data for the selected metric and time range at operation 1016. The process derives a plurality of performance status updates based on the performance metric data and the threshold at operation 1018. The process generates an audible performance indicator based on the plurality of performance status updates and a set of sound recordings at operation 1020. The process terminates thereafter.

While the operations illustrated in FIG. 10 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 11:
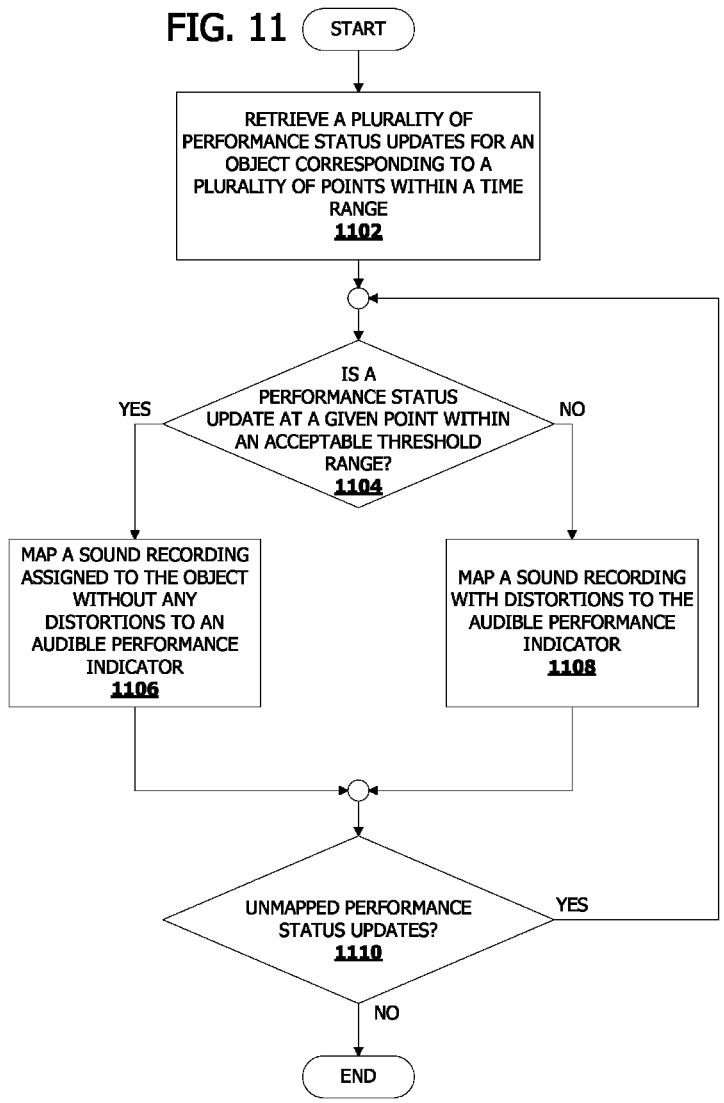
FIG. 11 is an exemplary flowchart illustrating generating a plurality of performance status updates for an object.

FIG. 11 is an exemplary flowchart illustrating generating a plurality of performance status updates for an object. The process shown in FIG. 11 may be implemented by a computing device, such as, but without limitation, computing device 100 in FIG. 1.

The process receives a plurality of performance status updates for an object corresponding to a plurality of points within a time range at operation 1102. The process determines whether a performance status update for a given point in time is within an acceptable threshold range at operation 1104. If the performance status update is within an acceptable threshold range, the process maps a sound recording assigned to the object without any distortions to an audible performance indicator at operation 1106.

Returning to operation 1104, if the performance status update indicates the performance status is not within an acceptable threshold range, the process maps a sound recording with distortions to the audible performance indicator at operation 1108. The process determines whether performance status updates are unmapped at operation 1110. If no, the process terminates thereafter.

If there are unmapped performance status updates at operation 1110, the process returns to operation 1104 and iteratively performs operations 1104 to 1110 until all performance status updates are mapped to the audible performance indicator.

While the operations illustrated in FIG. 11 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

Figure 12:
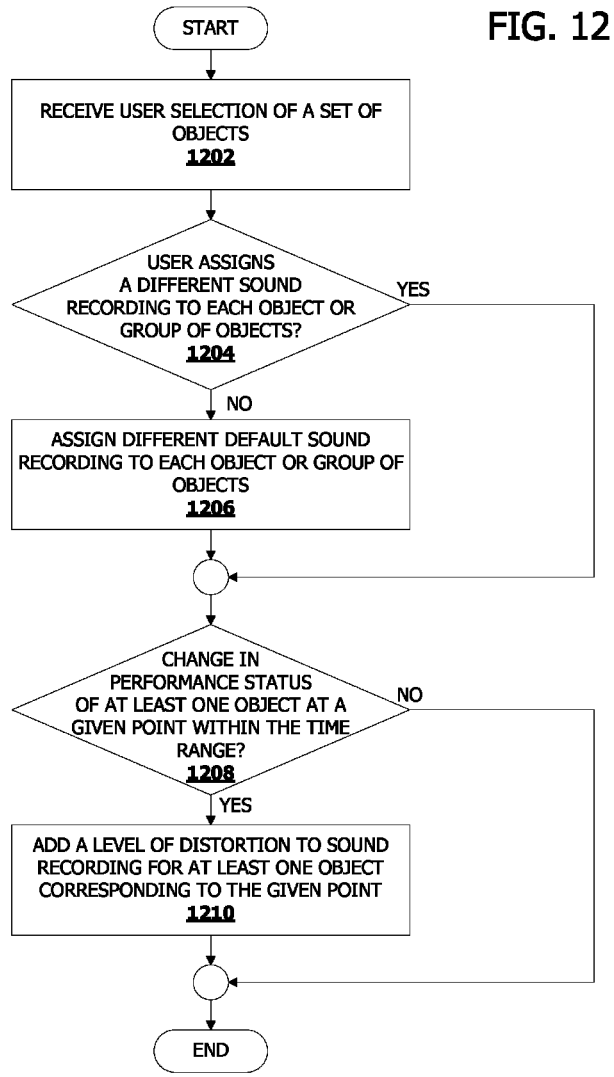
FIG. 12 is an exemplary flowchart illustrating generating an audible performance indicator having a level of distortion to indicate a performance status of an object at a given point in time.

FIG. 12 is an exemplary flowchart illustrating generating an audible performance indicator having a level of distortion to indicate a performance status of an object at a given point in time. The process shown in FIG. 12 may be implemented by a computing device, such as, but without limitation, computing device 100 in FIG. 1.

The process begins by receiving a user selection of a set of objects at operation 1202. The process determines whether a user assigns a different sound recording to each object or group of objects at operation 1204. If no, the process assigns a different default sound to each object or group of objects at operation 1206.

The process determines whether there is a change in performance status for at least one object at a given point within the time range at operation 1208. If no, the process terminates thereafter.

Returning to operation 1208, if there is a change in performance status of at least one object, the process adds a level of distortion to the sound recording for the at least one object corresponding to the audio playback at the given point within the time range (operation 1210). The process terminates thereafter.

While the operations illustrated in FIG. 12 are described as being performed by a computing device, such as computing device 100 shown in FIG. 1, aspects of the disclosure contemplate that performance of the operations by entities other than the computing device 100. For example, a user interface, a web browser, or a cloud service may perform one or more of the operations.

ADDITIONAL EXAMPLES

In some examples, one or more computer storage media embodying computer executable components are provided. The components include a performance dashboard controller that, when executed, cause at least one processor to receive a selection of a set of objects associated with a computing device. The performance dashboard controller, when executed, further causes at least one processor to derive a performance status of the selected set of objects at a plurality of points within a time range based on performance metric data and a set of performance thresholds for the selected set of objects. The performance metric data includes metric data quantifying performance of at least one object in accordance with at least one metric. The performance dashboard controller is further executed to cause the at least one processor to generate a set of audible performance indicators corresponding to the selected set of objects. The set of audible performance indicators comprising a set of sound recordings indicating the performance status of the at least one object at the plurality of points within the time range, an audible performance indicator for a given object comprising a sound recording and a level of distortion. The level of distortion indicating a severity of a performance problem associated with the given object.

In another example scenario, a data storage system includes data storage, the data storage including one or more data storage devices. A storage processor is coupled to the data storage. The storage processor includes one or more processors. A set of objects includes a set of physical objects and a set of logical objects of the data storage system. A database stores a set of performance status updates corresponding to a plurality of points within a time range for at least one object. A performance status update indicates a change in a performance status of the at least one object at a given point in time. A performance dashboard controller executes on the one or more processors to map the set of performance status updates to a set of sound recording to identify an audible performance indicator for the object. The audible performance indicator identifies a set of changes in the performance status of the object at the plurality of points relative to a performance threshold.

At least a portion of the functionality of the various elements in FIG. 1 may be performed by other elements in FIG. 2, FIG. 3, FIG. 4, or an entity (e.g., processor, web service, server, application program, computing device, etc.) not shown in FIG. 1. In some examples, operation illustrated in FIG. 9, FIG. 10, FIG. 11, and FIG. 12 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for sonification of performance metric data. For example, the elements illustrated in FIG. 1, such as when encoded to perform the operations illustrated in FIG. 9, FIG. 10, FIG. 11, and FIG. 12, constitute exemplary means for creating audible performance indicators for one or more objects based on performance metric data and a performance threshold.

More specifically, the performance dashboard controller illustrated in FIG. 1, such as when encoded to perform the operations illustrated in FIG. 9, constitute exemplary means for receiving a plurality of performance status updates for an object at a plurality of points within a time range based on performance metric data collected at the plurality of points and a performance threshold, exemplary means for mapping the plurality of performance status updates to a set of sound recordings to identify an audible performance indicator for the object, and exemplary means for outputting the audible performance indicator.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
   deriving a plurality of performance status updates for an object at a plurality of points within a time range, by a performance dashboard controller, based on performance metric data collected at the plurality of points and a performance threshold, the performance metric data identifying a performance status of a given object at a given point in time within the time range based on at least one metric;
   mapping the plurality of performance status updates to a set of sound recordings to identify an audible performance indicator for the object, the audible performance indicator sonifying the plurality of performance status updates at the plurality of points relative to the performance threshold; and
   outputting the audible performance indicator via an output device, the audible performance indicator comprising the set of sound recordings and a level of distortion associated with the set of sound recordings, the set of sound recordings comprising a first sound corresponding to a first performance status of the object at a first point within the time range and a second sound corresponding to a second performance status of the object at a second point within the time range, wherein a change in the level of distortion indicates a change in performance status of the object during the time range.

2. The computer-implemented method of claim 1, wherein the audible performance indicator comprises an assigned sound associated with the object and further comprising:
   on determining that the second performance status of the object at the second point within the time range is outside an acceptable threshold range, playing the assigned sound with a distortion, wherein an amount of the distortion added to the assigned sound indicates a severity of a performance problem associated with the object.

3. The computer-implemented method of claim 2, wherein the distortion comprises a change in at least one of tempo, amplitude, pitch, volume, or noise level of the assigned sound.

4. The computer-implemented method of claim 1, wherein the audible performance indicator comprises an assigned sound and further comprising:
   on determining a performance status of the object falls within the performance threshold at a selected time, playing the assigned sound with an absence of distortions at a point corresponding to the selected time;
   on determining the performance status of the object exceeds the performance threshold by a first level at the selected time, playing the assigned sound with a first level of distortion at the point corresponding to the selected time; and
   on determining the performance status of the object exceeds the performance threshold by a second level at the selected time, playing the assigned sound with a second level of distortion at the point corresponding to the selected time.

5. The computer-implemented method of claim 1, further comprising:
   playing a plurality of audible performance indicators corresponding to a plurality of objects simultaneously, wherein a first audible performance indicator corresponding to a first object comprises a sound recording that is different from a sound recording associated with a second audible performance indicator corresponding to a second object in the plurality of objects.

6. The computer-implemented method of claim 1, further comprising:
   filtering the performance metric data in accordance with at least one read operation, wherein the performance dashboard controller generates audible performance indicators for a set of objects associated with the at least one read operation.

7. The computer-implemented method of claim 1, further comprising:
   filtering the performance metric data in accordance with at least one write operation, wherein the performance dashboard controller generates audible performance indicators for a set of objects associated with the at least one write operation.

8. The computer-implemented method of claim 1, further comprising:
   filtering the performance metric data in accordance with at least one selected application, wherein the performance dashboard controller generates audible performance indicators for a set of objects associated with the at least one selected application.

9. The computer-implemented method of claim 1, further comprising:
   receiving a user selected grouping criteria;
   applying the grouping criteria to filter a plurality of objects to form a correlated set of objects; and
   providing a plurality of audible performance indicators, by the performance dashboard controller, wherein the plurality of audible performance indicators represent the correlated set of objects and identifies changes in the performance status of one or more objects in the correlated set of objects over time.

10. One or more non-transitory computer storage media embodying computer executable components, said components comprising a performance dashboard controller, that, when executed, cause at least one processor to:
    receive a selection of a set of objects associated with a computing device;
    derive a performance status of the selected set of objects at a plurality of points within a time range based on performance metric data and a set of performance thresholds for the selected set of objects, the performance metric data comprising metric data quantifying performance of at least one object in accordance with at least one metric; and generate a set of audible performance indicators corresponding to the selected set of objects, the set of audible performance indicators comprising a set of sound recordings indicating the performance status of the at least one object at the plurality of points within the time range, an audible performance indicator for a given object comprising a sound recording and a level of distortion, the level of distortion indicating a severity of a performance problem associated with the given object.

11. The computer storage media of claim 10, wherein a distortion comprises a change in at least one of tempo, amplitude, pitch, volume, or noise level of the assigned sound.

12. The computer storage media of claim 10, wherein the performance dashboard controller is further executed to cause the at least one processor to:

play a first audible performance indicator for the given object without distortion at a point corresponding to a selected time to indicate the performance status of the given object is within the performance threshold for the given object at the selected time, on determining the performance status of the object falls within the performance threshold at the selected time;

play a second audible performance indicator with a first level of distortion at a point corresponding to the selected time, on determining the performance status of the object exceeds the performance threshold by a first level at the selected time; and play a third audible performance indicator with a second level of distortion at a point corresponding to the selected time, on determining the performance status of the object exceeds the performance threshold by a second level at the selected time.

13. The computer storage media of claim 10, wherein a sound in the set of sounds is at least one of a musical instrument, a whistle, a beep, a humming sound, a nature sound, weather sound, or animal sound.

14. The computer storage media of claim 10, wherein the performance dashboard controller is further executed to cause the at least one processor to:

generate a graphical icon representing objects in the set of objects in a performance dashboard display, wherein a user selects the graphical icon representing the given object to play the audible performance indicator for the given object.

15. A data storage system comprising:

a data storage, the data storage comprising one or more data storage devices;

a storage processor coupled to the data storage, the storage processor comprising one or more processors;

a set of objects, the set of objects comprising a set of physical objects and a set of logical objects of the data storage system;

a database comprising a set of performance status updates corresponding to a plurality of points within a time range for at least one object, a performance status update indicating a change in a performance status of the at least one object at a given point in time;

a performance dashboard controller executing on the one or more processors, the performance dashboard controller mapping the set of performance status updates to a set of sound recordings to identify an audible performance indicator for the object, the audible performance indicator sonifying a set of changes in the performance status of the object at the plurality of points relative to a performance threshold; and a performance dashboard display comprising a graphical icon representing the at least one object, wherein a user selects the graphical icon representing the at least one object to play the audible performance indicator for the given object.

16. The data storage system of claim 15, further comprising:

an output device, wherein the output device outputs the audible performance indicator.

17. The data storage system of claim 15, further comprising:

a performance monitor, wherein the performance monitor polls the set of storage system objects for performance metric data and stores the performance metric data in the database.

18. The data storage system of claim 15, further comprising:

at least one performance metric associated with a given object in the set of objects, the at least one performance metric comprising a latency, queue length, processor utilization, cache hit ratio, cache dirty percentage, or bandwidth.

19. The data storage system of claim 15, wherein the audible performance indicator comprises at least one distortion added to a sound, the distortion comprising a change in at least one of tempo, amplitude, pitch, volume, or noise level of the assigned sound.

20. The data storage system of claim 15, wherein a sound in the set of sounds is at least one of a musical instrument, a whistle, a beep, a humming sound, a nature sound, a weather sound, or an animal sound.

* * * * *